Patented Jan. 5, 1932

1,839,774

UNITED STATES PATENT OFFICE

GEORGE A. RICHTER, OF BERLIN, NEW HAMPSHIRE, ASSIGNOR TO BROWN COMPANY, OF BERLIN, NEW HAMPSHIRE, A CORPORATION OF MAINE

MAKING OF SODA CELLULOSE FOR CONVERSION INTO VISCOSE

No Drawing.  Application filed July 27, 1929. Serial No. 381,694.

This invention relates to the conversion of cellulose fiber into its derivatives, being more particularly concerned with the making of soda cellulose such as is xanthated into viscose syrups serving for rayon manufacture or the like. According to the viscose-rayon process, cellulose fiber is immersed in caustic soda solutions of mercerizing strength, and the resulting soda-cellulose, so called, is aged until it may be converted into viscose syrups suitable for spinning.

Various types of cellulose fiber may be used as raw material for rayon manufacture, including cotton fiber, which consists of substantially only alpha cellulose, and chemical wood pulps such as bleached sulphite, which has an alpha cellulose content of about 85% to 87%. When raw suphite pulp is digested in alkaline liquors or is first treated with oxidizing agents, such as chlorine water, and is then digested in alkaline liquors, a substantial proportion of its non-alpha cellulose components, including coloring matter, may be removed therefrom, so that the refined fiber may, after bleaching, have an alpha cellulose content of about 94% or greater. Such refined wood pulp is an excellent raw material for rayon manufacture, being serviceable as a substitute for the more expensive cotton fiber for this purpose, as, generally speaking, the higher the alpha cellulose content of the raw material, the better the luster, color, strength, and other characteristics of the finished rayon.

During ageing of the soda-cellulose prepared from cellulose fiber, a change sometimes known as depolymerization, which is accompanied by a lowering of the solution viscosity of the fiber, takes place, so that the aged fiber may be converted into viscose syrups of a viscosity sufficiently low for spinning. (By solution viscosity is meant the viscosity of a cellulose derivative solution prepared from the fiber. The solution usually employed as a standard is a cuprammonium cellulose solution of definite cellulose concentration, the viscosity being determined by measuring the time of efflux of a definite volume of the solution under standard conditions, through an orifice of standard size. The viscosity values hereinafter given are absolute C. G. S. units, and are determined by measuring the viscosity of a solution of 6 grams of dry fiber in a cuprammonium solution composed of 225 cc. of 28% ammonia water containing 9 grams of cuprous oxide. The C. G. S. unit is employed because it is definite, denoting a viscosity 100 times that of water at 20° C., wherefore a cuprammonium cellulose solution prepared from a certain type of fiber and by means of which such fiber is identified as having a solution viscosity of 10, is 1000 times as viscous as water at 20° C.) While the fiber is undergoing the desired lowering of solution viscosity, undesirable secondary reactions generally take place, causing a degradation of the alpha cellulose content of the fiber, so that after ageing, the fiber may have an alpha cellulose content distinctly lower than that of the fiber used as a raw material. When, for instance, a refined sulphite pulp having an initial viscosity of about 6 is used as a raw material, it is the usual practice to age the soda-cellulose prepared from such fiber at about 18° C. for about 72 hours, as the aged product has a viscosity of about 0.5, which is satisfactory for spinning. Ageing leaves its telltale marks on such fiber by a noteworthy lowering of its alpha cellulose content, and should a refined sulphite pulp having an initial viscosity of about 6 and an alpha cellulose content of about 94% be used as a raw material, and its ageing be effected at 18° C. for a period materially longer than 72 hours, or be effected at a temperature much above 18° C. for the usual 72-hour period, its alpha cellulose content may fall to about 90%, or even lower.

I have found that when chemical wood pulps, such as kraft or soda pulp, are refined to high alpha cellulose content, as by treating with alkaline liquors, or by first treating with oxidizing agents, such as chlorine water, and then treating with alkaline liquors, the refined fiber, when bleached, is more satisfactory for rayon manufacture than bleached, refined chemical wood pulps of other types, such as refined sulphite pulp. Whereas soda-cellulose prepared from refined sulphite pulp undergoes marked degradation during ageing, soda-cellulose prepared from refined kraft pulp, when aged under the same conditions, undergoes comparatively little reduction in alpha cellulose content. It is probable that reduction in alpha cellulose content is caused by oxidation of the fiber by the oxygen of the atmosphere, and further that whereas an acid-liberated fiber such as sulphite pulp is sensitive to such oxidation in the presence of alkali, an alkali-liberated fiber such as kraft pulp is far more resistant to such oxidation. For instance, soda-cellulose prepared from a white, refined kraft pulp having an alpha cellulose content of about 96%, after ageing at 18° C. until its solution viscosity has been reduced to about 0.5, still has an alpha cellulose content of about 96%, and when xanthated results in viscose syrups of extraordinary freedom from unxanthated fiber. Accordingly, such viscose syrups may be spun into light-colored rayons without danger of plugging the orifices of the spinnerets. Whereas viscose syrups such as produced from sulphite pulp as a raw material are of dark orange color, syrup made from a refined kraft pulp has a lemon color, and may be spun into easily bleachable rayons of unusually good luster, strength, and dyeing properties.

An important advantage which may be realized by the use of refined alkali-liberated pulps such as kraft as a raw material in the viscose-rayon process is that the time of ageing may be materially shortened, as the temperature of ageing may be increased to accelerate depolymerization and reduction of the solution viscosity of the fiber without seriously degrading it. When pulp is refined under certain conditions, the product may have a high initial viscosity, say, from 25 to 30, or may have a low initial viscosity and yet resist lowering of its solution viscosity. In such case, the ageing period must be extended beyond that usually employed, or the temperature under which ageing is effected must be raised. With a refined sulphite pulp, a raising of the temperature under which ageing is effected is accompanied by such a marked degradation of the fiber that the time saved may be more than offset by the injurious effects on the fiber. When a refined kraft pulp which has high initial viscosity or which resists lowering of its solution viscosity is used as a raw material, however, the temperature of ageing may be raised from the usual temperature of 18° C. to a temperature of 25° C., and it is possible to produce an aged product of the viscosity and alpha cellulose content desired for spinning in a period of about half that required at 18° C. The present invention further makes available chemical wood pulps, such as kraft and soda pulp, for use as raw material in the viscose-rayon process, thus opening up stores of raw material heretofore considered unsuitable for such purpose.

I claim:

1. Aged soda cellulose capable of being directly and substantially completely xanthated, the cellulose base of which consists of wood pulp having an alpha cellulose content of at least about 96%.

2. A process which comprises treating alkali-refined chemical wood pulp of the character of soda and kraft pulp having an alpha cellulose content of at least about 96% with a mercerizing solution of caustic soda to form soda cellulose, and then ageing the soda cellulose in the presence of air and at a temperature of as high as about 25° C. to produce a product capable of being directly and substantially completely xanthated and still having an alpha cellulose content of at least about 96%.

3. Aged soda cellulose capable of being directly and substantially completely xanthated, the cellulose base of which consists of alkali-refined chemical wood pulp of the character of soda and kraft pulp and having an alpha cellulose content of at least about 96% before and after ageing.

In testimony whereof I have affixed my signature.

GEORGE A. RICHTER.